United States Patent
Fioretti

(10) Patent No.: US 6,723,196 B2
(45) Date of Patent: Apr. 20, 2004

(54) MACHINE AND METHOD FOR FORMING A CONTAINER STARTING FROM A REEL OF MATERIAL IN WEB FORM

(75) Inventor: Luigi Fioretti, S. Lazzaro di Savena (IT)

(73) Assignee: Societa'per Azioni Curti-Cosruzioni Meccaniche, Castel Bolognese (IT)

( * ) Notice: Subject to any disclaimer, the term of this patent is extended or adjusted under 35 U.S.C. 154(b) by 0 days.

(21) Appl. No.: 09/866,795

(22) Filed: May 30, 2001

(65) Prior Publication Data

US 2002/0035022 A1 Mar. 21, 2002

(30) Foreign Application Priority Data

Sep. 19, 2000 (IT) ..................................... BO2000A0543

(51) Int. Cl.⁷ ............................................... B29C 53/00
(52) U.S. Cl. ......................... 156/218; 156/69; 264/542; 264/548; 264/573; 425/523; 425/534
(58) Field of Search ........................ 156/69, 293, 308.2, 156/309.6, 556, 566, 567; 264/523, 524, 531, 534, 544, 545, 542, 543, 573; 425/523, 527, 531, 534; 53/140; 215/370

(56) References Cited

U.S. PATENT DOCUMENTS 3,217,071 A * 11/1965 Plymale et al. ............. 264/542
3,505,705 A    4/1970 Stroop
4,366,016 A * 12/1982 Golden, Jr. .................. 156/218
4,430,142 A *  2/1984 Ochi et al. ................ 156/379.9
4,436,569 A    3/1984 Somerfleck
4,796,766 A *  1/1989 Clark .......................... 215/370

FOREIGN PATENT DOCUMENTS

| DE | 1679904 | 3/1972 |
|---|---|---|
| EP | 1008528 | 6/2000 |
| FR | 1403746 | 6/1965 |

* cited by examiner

Primary Examiner—Jeff H. Aftergut
Assistant Examiner—John L. Goff
(74) Attorney, Agent, or Firm—Browdy and Neimark, P.L.L.C.

(57) ABSTRACT

A method for forming a container (7) starting from a web (3) of heat-bondable material wound on a reel (4) comprises the following operations: forming a tubular element (5) of predetermined diameter and height; mounting the tubular element (5) over a support (16); closing one end of the tubular element (5) to form the open container (7); inserting the container (7) into a mould (12) after heating if necessary; forcing the walls of the container (7) against the inner walls of the mould (12); opening the mould and withdrawing the container (7) from the support (16).

8 Claims, 8 Drawing Sheets

MACHINE AND METHOD FOR FORMING A CONTAINER STARTING FROM A REEL OF MATERIAL IN WEB FORM

BACKGROUND OF THE INVENTION

1. TECHNICAL FIELD OF THE INVENTION

The present invention falls within the technical sector concerning devices and methods for forming containers for liquid, granular and powder materials, for example for drinks, solid or semi-liquid foods, cleaning products and others.

In particular, the invention relates to a machine and method for forming a container starting from a reel of thermally bondable material in web form, such as polyethylene, polypropylene and all plastic materials, including those bonded to each other and/or to paper or aluminium.

2. PRIOR ART

Devices are known which, starting from one or more shaped flat sheets of material of the so-called bonded type, are able to form a flat walled container, for example of parallelepiped or tetrahedron shape, such as those widely used for containing still drinks.

Devices are also known for forming flat walled containers provided with opening tabs, stoppers or spouts for pouring out the container contents.

The main drawback of known devices is the fact that they can form only flat walled containers generally of parallelepiped shape, and hence very similar to each other, so preventing characterisation and differentiation of the contained product, as instead the industry requires.

A further drawback of known devices is the fact that the flat walls easily deform when internal or external pressures are present, so preventing packaging of products which generate even small pressures, for example moderately sparkling drinks, and leading to undesirable escape of the product from the opened container if gripped too strongly.

OBJECT AND SUMMARY OF THE FOLLOWING

The main object of the present invention is to propose a machine and method for forming a container starting from a reel of material in web form which are able to give the container different shapes, including curved walls.

Another object is to propose a machine and method for providing the containers with at least a moderate rigidity to resist at least moderate internal and external pressures.

Another object is to propose a machine and method for forming containers from continuous webs of synthetic materials bonded to aluminium or paper, or from continuous webs of single-layer synthetic materials.

A further object of the present invention is to propose a machine which is of simple construction and maintenance, of high reliability and economically advantageous.

The objects of the invention are attained by a method consisting of folding, and bonding together the edges of, a web unwound from a reel to form a tubular element which is cut into parts of equal length which are mounted over a preferably cylindrical support.

The tubular element is then bonded transversely to its axis to form a closed base, or alternatively a separate base is applied to the end of the tubular element, to hence form an open container.

This latter, still mounted over the respective cylindrical support, is inserted into a mould which is closed about the cylindrical support, and here subjected to internal pressure after heating.

The open container hence assumes the shape of the walls of the mould to which it adheres, and after opening the mould and after suitable cooling it is removed from the tubular support.

According to the invention, the heating temperature is between 30° C. and 60° C., whereas the cooling temperature is between 5° C. and 30° C.

The open edge of the container mounted over the cylindrical support can be subjected to an operation for forming a flat flange before its insertion into the mould.

The invention also comprises a machine for forming containers starting from a web wound on a reel, comprising a station in which the web is folded into two, bonded along its facing longitudinal edges and cut into tubular elements of equal length.

An endless conveyor supporting a series of identical cylindrical supports arranged to receive said tubular elements conveys them to the various processing stations.

The first of these is a bonding station arranged to close one end of the tubular element to form a container.

The next station is the forming station in which a mould composed of several mutually movable parts is closed about the cylindrical support to create a sealed chamber; suitable means for heating a compressed gas and feeding it into the container inflate the container to force it against the mould walls from which it assumes its shape.

The mould is then opened and the shaped container withdrawn from the respective cylindrical support.

BRIEF DESCRIPTION OF THE DRAWINGS

The merits and the operational and constructional characteristics of the invention will be more apparent from the ensuing detailed description which, with the aid of the accompanying drawings, illustrates a particular preferred embodiment and a variant thereof by way of non-limiting example.

FIG. 12 is an exploded view of a portion of the container.

DETAILED DESCRIPTION OF THE PREFERRED EMBODIMENTS(S) OF THE INVENTION

Figure 1:
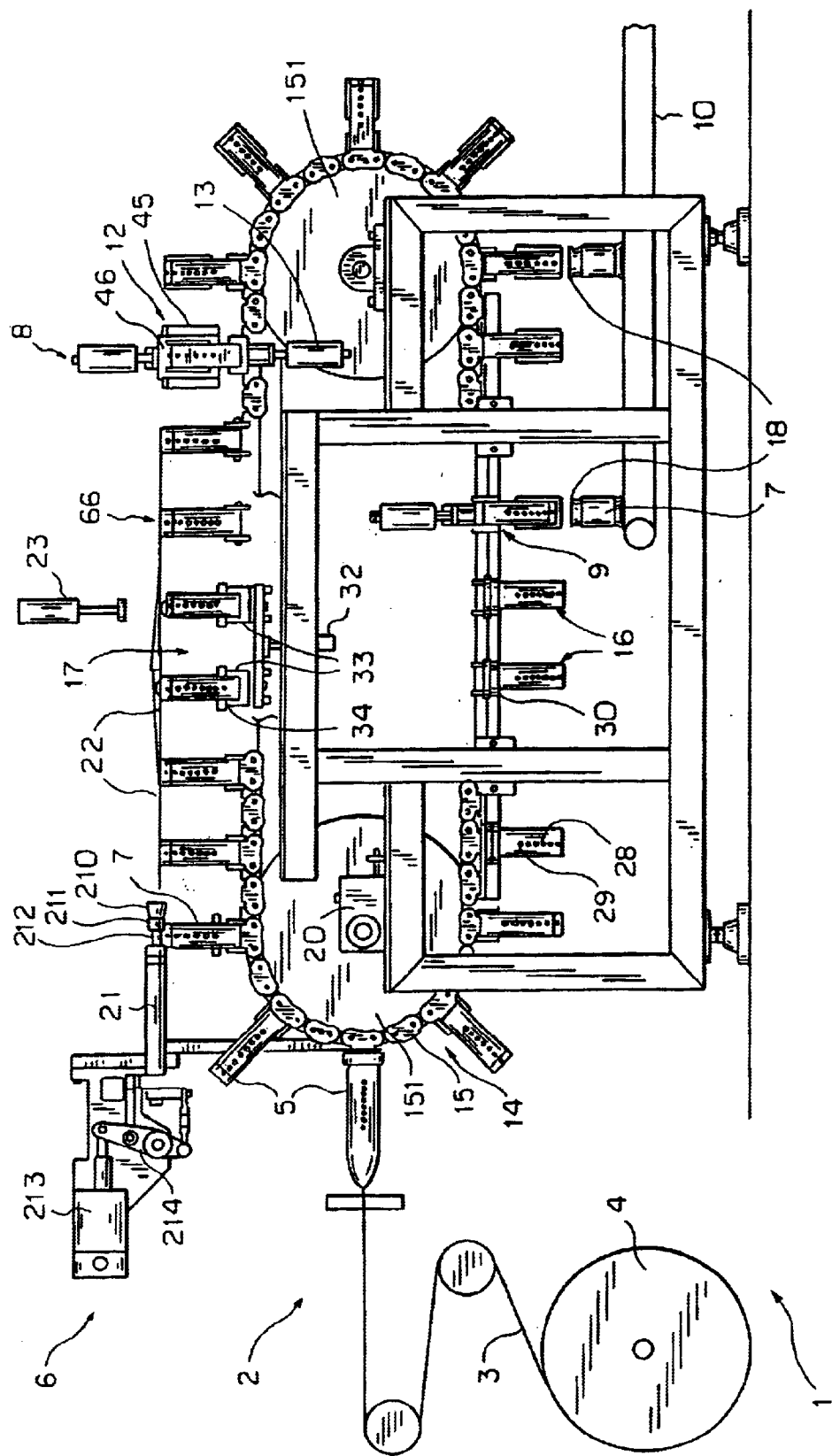
FIG. 1 is a schematic side view of a first embodiment of the machine of the present invention, from which certain parts have been removed in order to better illustrate others.

With reference to FIGS. 1 to 4, the reference numeral 1 indicates the machine for forming a container of flexible material in web form 3 unwound from a reel 4.

It comprises conveyor means 14 having a pair of endless parallel chains 15 passing about sprockets 151 intermittently driven by means 20, their links carrying a series of equidistant cylindrical supports 16.

The supports 16 are individually supported by a parallelepiped base 30 fixed to the chain links.

Figure 7:
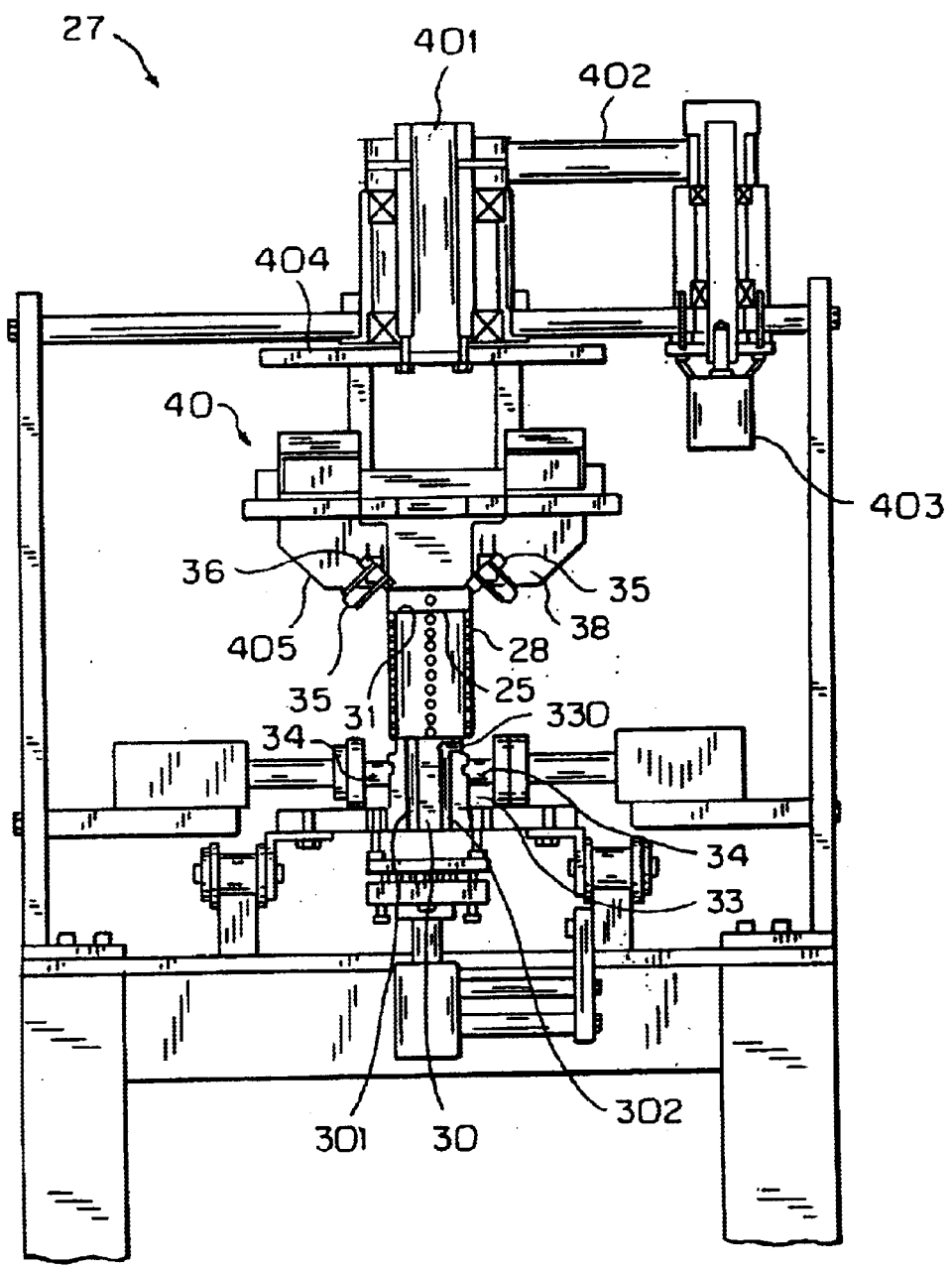
FIGS. 7 and 8 are respectively an enlarged front view and an enlarged top plan view of elements of the machine of FIG. 6.
Figure 9:
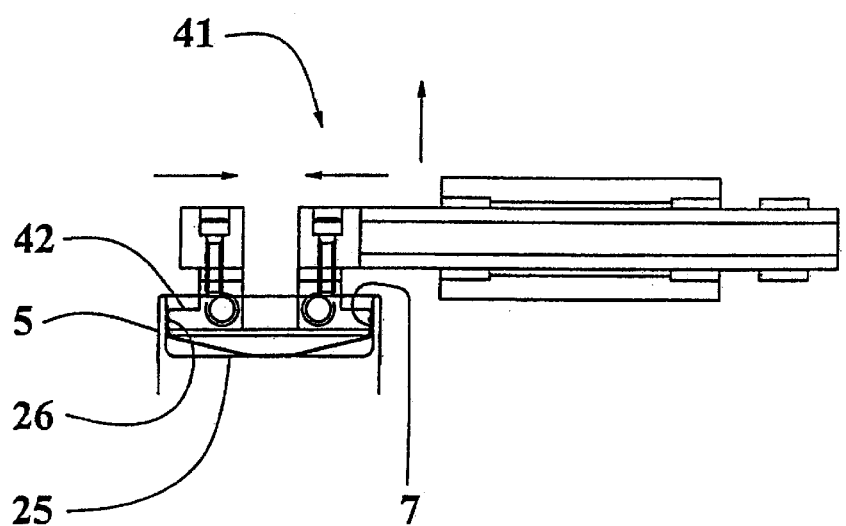
FIG. 9 is a section through the element of FIG. 8 on the plane IX—IX.
Figure 8:
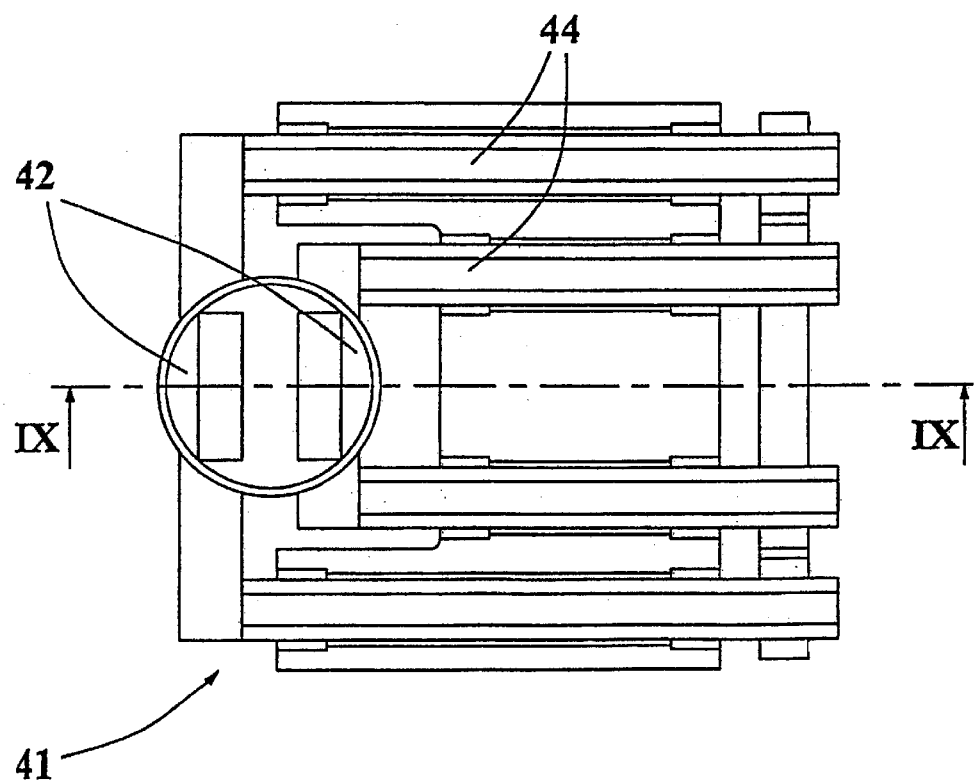
Figure 10:
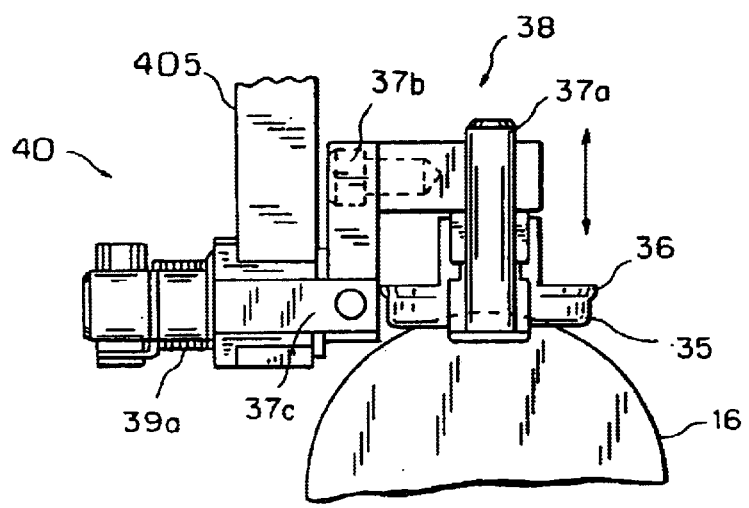
FIG. 10 is an enlarged view from above showing elements of the machine of FIG. 6.
Figure 11:
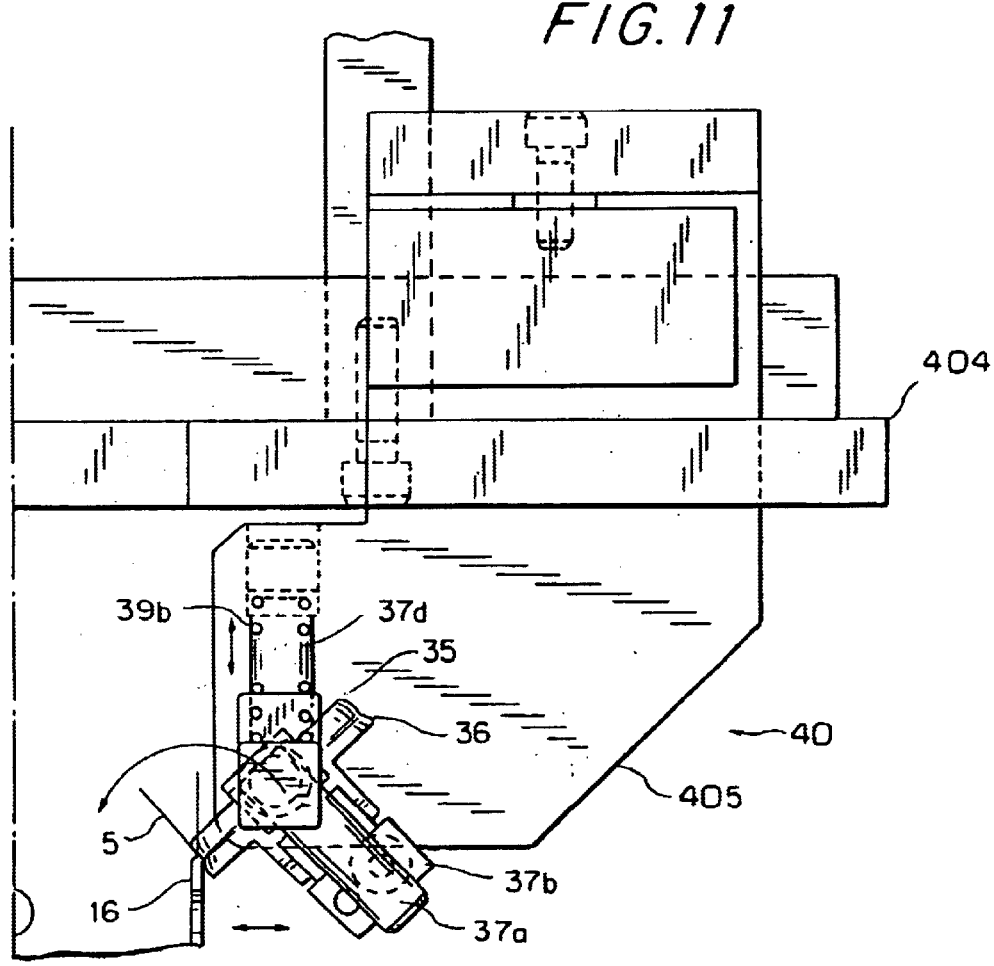
FIG. 11 is a side view of elements of FIG. 10.

Each support 16 comprises an internally hollow tubular portion 28 provided with holes 29 along four generators at 90° apart and is connected to the underlying base via a groove 330 intended to contain a gasket 47 described hereinafter. The interior of the base 30 communicates with the outside via conduits 301 visible in FIG. 7, to be connected to a pressurized gas supply.

The transverse dimensions and height of the support 16 are slightly less than the corresponding transverse dimensions and height of the container 7, the portion 28 of the support 16 being of cylindrical or profiled shape.

The base 30 consists of a profiled plate. The inner surface of each support 16 carries, at its free end portion, an abutment shoulder 31 (shown in FIG. 12).

At one end, namely the left end in FIG. 1, the machine 1 comprises a station 2 for forming and cutting a tubular element 5 starting from the web wound on the reel 4.

The means for folding the web into two, bonding it along a generator to form the tubular element 5, mounting the end of the tubular element 5 over the cylindrical support 16 lying in a horizontal position in front of the station 2, and cutting off a determined length of said tubular element which remains mounted over the support are not described or illustrated as they are of usual type, easily imaginable and designable by the average expert.

Immediately downstream of the station 2 the machine comprises a station 6 for closing the bottom 66 of the tubular element to create the container 7.

Figure 2:
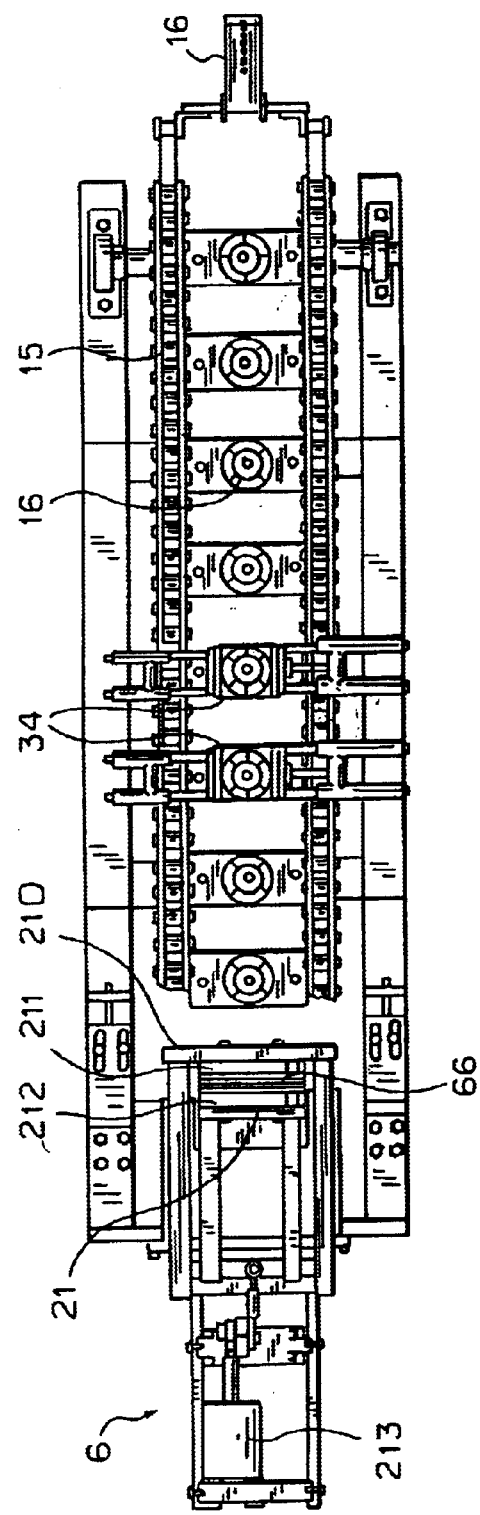
FIG. 2 is a view of the machine of FIG. 1 from above, from which certain parts have been removed in order to better illustrate others.
Figure 3:
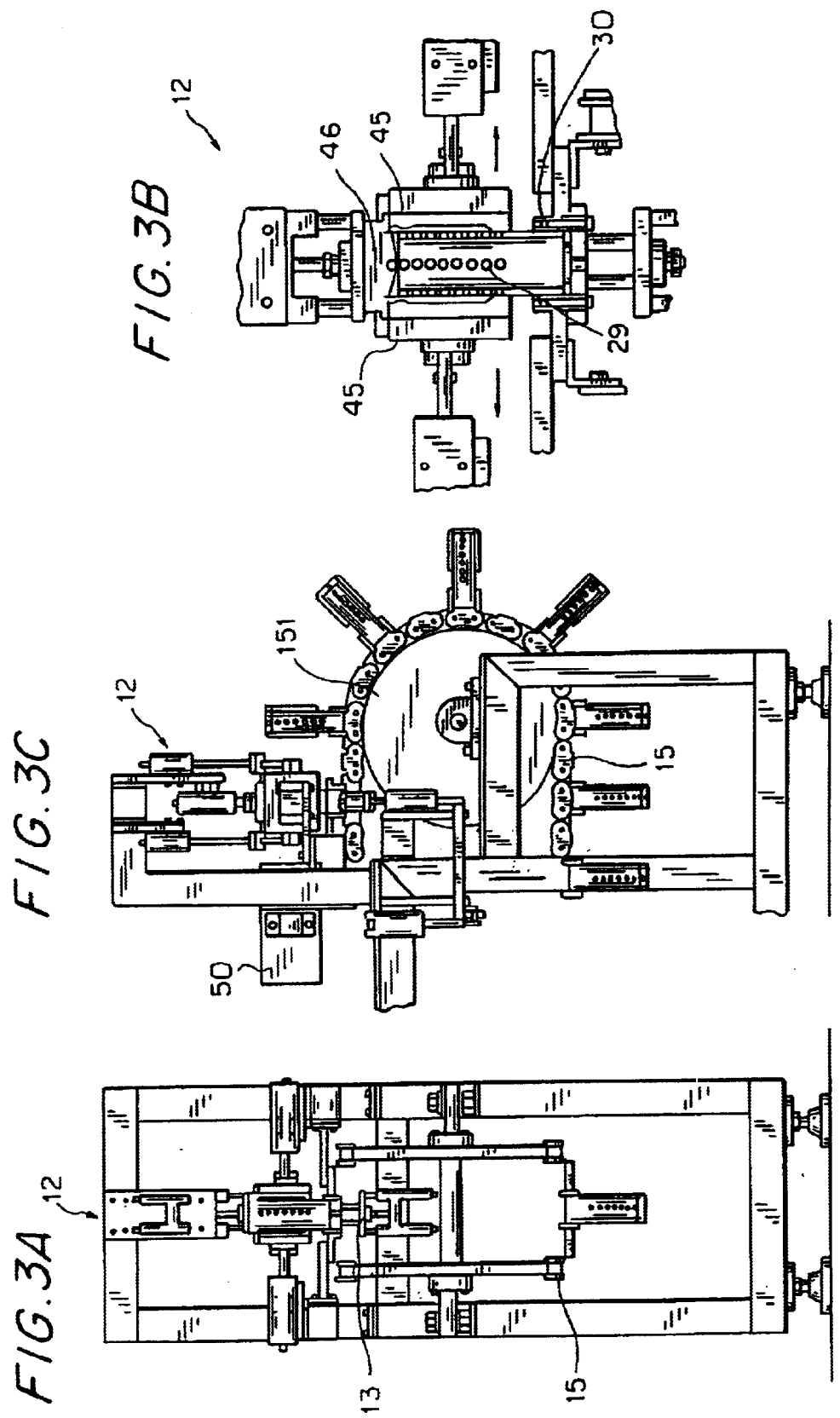
FIGS. 3A, 3B and 3C are respectively a side view, a partial front view and an enlarged side view of the shaping station.
Figure 4:
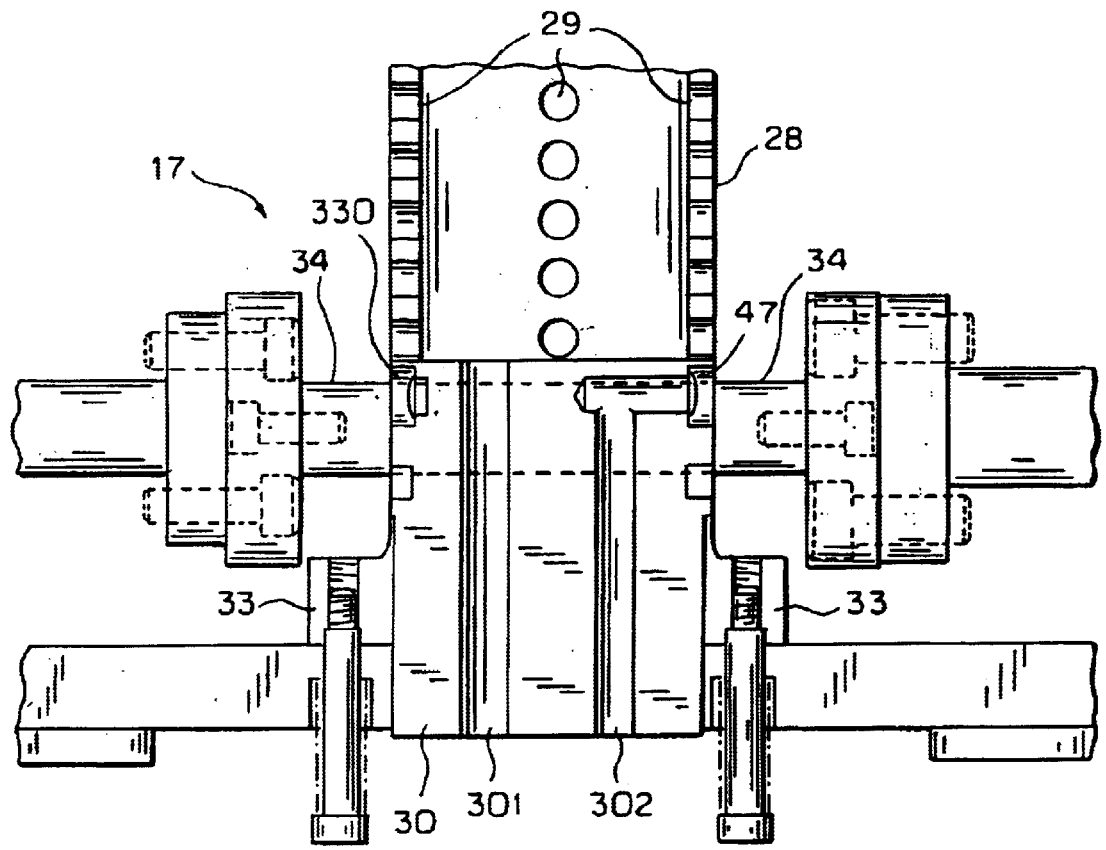
FIG. 4 shows a detail of the machine of FIG. 1.

In the embodiment illustrated in FIGS. 1 and 2, said means comprise a pair of heated bonding bars 211 and 212 supported respectively by a fixed support 210 and a movable support 21 driven by the cylinder-piston unit 213 via a lever 214 to be cyclically moved a distance from and close to the fixed support.

By virtue of the to-and-fro movement, the bonding bars are clamped together onto the outer mouth of the tubular element 5 to close it and form a container 7.

Downstream of the station 6 the supports 16 pass below a series of profiled metal plates 22 which fold the ends of the bonded edge inwards towards each other until a presser element consisting of a profiled punch 23 causes said ends to adhere to the flat closed base of the container 7. In particular, said punch compels the container base to partially retract into the container 7 to adhere to its walls.

Along that portion occupied by the plates 22 the machine comprises means 17 for forming a flange 18 at the open end of the container 7 facing the base 30.

Said means comprise an annular abutment 33 axially slidable within a seat provided in each base 30 in the region adjacent to the tubular cylindrical portion 28.

Figure 5:
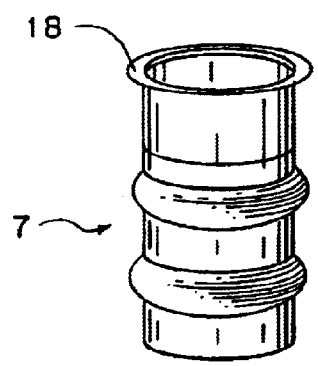
FIG. 5 is an enlarged perspective view of a container formed by the machine of FIG. 1.

The annular abutments 33 are forced against the open end of the container mounted over the support 16 by reciprocating linear actuators 32, shown schematically in FIG. 1, to form a flange 18, shown in FIG. 5 and intended to receive a flat closure element.

To oppose the action of the abutment 33, counteracting means 34 are provided, each consisting of clamps disposed transverse to the conveyors 15, which retain the container 7.

Downstream of the means for flattening the base and forming the flange there is positioned the shaping station 8 in which each container 7 undergoes a permanent deformation.

Said shaping station 8 comprises a mould 12 comprising two facing shells 45 able to be spaced apart to allow entry of the support 16 with the relative container, and an upper closure member 46.

The means for moving said shells 45 and said member 46 will not be described in detail.

When the conveyor 15 has placed a cylindrical support 16 within the shells, these are moved towards each other into mutual contact, and the member 46 is lowered to form with the base 30 a closed chamber which surrounds the support 16.

Pneumatic means 13 are provided for feeding a pressurized gas into the support 16.

By feeding gas at a pressure of between 3 and 30 bar into the support 16, the walls of the container 7 are made to adhere to the walls of the shells 45 and assume their shape. The pneumatic means 13 consist of conduits 301 and 302 provided within the base 30 and connecting a source of compressed gas, such as a motor-driven air compressor, to the mould interior via the base 30.

Said connection via said conduits is made by a pneumatic coupling which is connected automatically to them.

The pneumatic means 13 comprise at least one shut-off valve, such as a solenoid valve.

As stated, the supports 16 comprise, in proximity to the respective bases 30, a seat 330 for an annular gasket 47. The seat is connected to a source of compressed gas via the conduit 302.

During the formation of the container 7 within the mould 12, the gasket 47 expands by the effect of the compressed gas, for example the pressurized gas fed into the interior of the mould 12, to press the mouth portion of the container 7 against the corresponding region of the mould 12.

The shaping station 8 also comprises means 50 (FIG. 3C) for heating the container 7 to a heating temperature of between 30° C. and 60° C. The heating means consist, for example, of hot air blowing devices, or plates provided with electrical resistance elements, or infrared heaters. The mould 12 can comprise means for cooling the container 7 to a cooling temperature of between 30° C. and 60° C. The cooling means 7 can comprise an open or closed circuit provided with conduits for circulating a cooling fluid, for example water, which extend within the walls of the pair of shells 45 and/or the member 46. The cooling means for the container 7 can also comprise a circulation pump and/or at least one solenoid valve, and adjustable temperature control devices for the fluid.

When formed and shaped, the containers 7 are removed from the relative supports and transferred by expulsion means 9, such as compressed air blowers, to exit means 10, consisting for example of conveyor belts.

In the variant shown in FIGS. 6 to 11, the bonding station 6 comprises a positioning means 24, for example of the pick-and-place type, to position a base 25 against the inner shoulder 31 of the tubular portion 28 of the support 16.

The base 25, for example circular or polygonal, is provided with a peripheral wall 26 perpendicular to the flat surface of the base.

Clinching means 27 (FIG. 7) are provided to clinch the end of the wall of the tubular element 5 against the inner surface of the peripheral wall 26, and bonding means 41 for bonding the peripheral wall 26 to the wall of the tubular element 5 to form the base of the container 7.

The clinching means 27 comprise two mutually facing cylindrical idle wheels 35, each provided with an annular lip 36. Each wheel is connected, via an articulated system (FIGS. 10 and 11), to a unit 40 which causes it undergo rotation and translation.

The unit 40 comprises an idle shaft 401 suspended from the machine frame and connected by a transmission 402 to an electric motor 403 for its rotation. The shaft supports a circular plate 404 on which two coplanar angular plates 405 slide, each carrying an articulated system 38.

This latter comprises a crank, of which the arm 37c is rotatably received in the angle plate 405 and the arm 37b supports the pin 37a of the wheel 35. The arm 37b is rotatable about its axis relative to the crank arm, whereas the arm 37c can translate parallel to itself relative to the angle plate 405 (FIG. 11), being connected to this latter by slidable means 39d.

The dimensions of the crank are such that the arm 37c is aligned with the diameter of the wheel 35.

The articulated system 38 also comprises first elastic means 39a and second elastic means 39b intended to maintain the wheel 35 urged against the edge of the cylindrical support 16.

Means are provided for translationally moving the angle plates 405 within their plane towards and away from the axis of rotation and for maintaining them equidistant from this latter.

To effect clinching, with the unit 40 coaxial to the tubular element 5, the symmetrical translation of the angle plates 405 causes the wheels 35 to approach each other until the respective annular lips 36 of the wheels 35 rest against the edge of the tubular element 5 at the free end of the support 16; rotating the unit 40 causes the wheels 35 to adhere along the entire path of the end of the support; the simultaneous movement of the wheels 35 towards the centre due to the progressive approach of the angle plates 405, in cooperation with the rotation, results in progressive clinching of the edge of the container along its interior. The tubular element 5 is disengaged from the wheels 35 by withdrawing these latter.

The articulated system 38 enables the wheels 35 to translate towards the axis of rotation of the unit 40 while varying its orientation about the axis in order to maintain the lip 36 against the edge of the support element 16 and enable progressive clinching of the edge of the tubular element 5 against the end of the wall 26 of the base 25.

Figure 6:
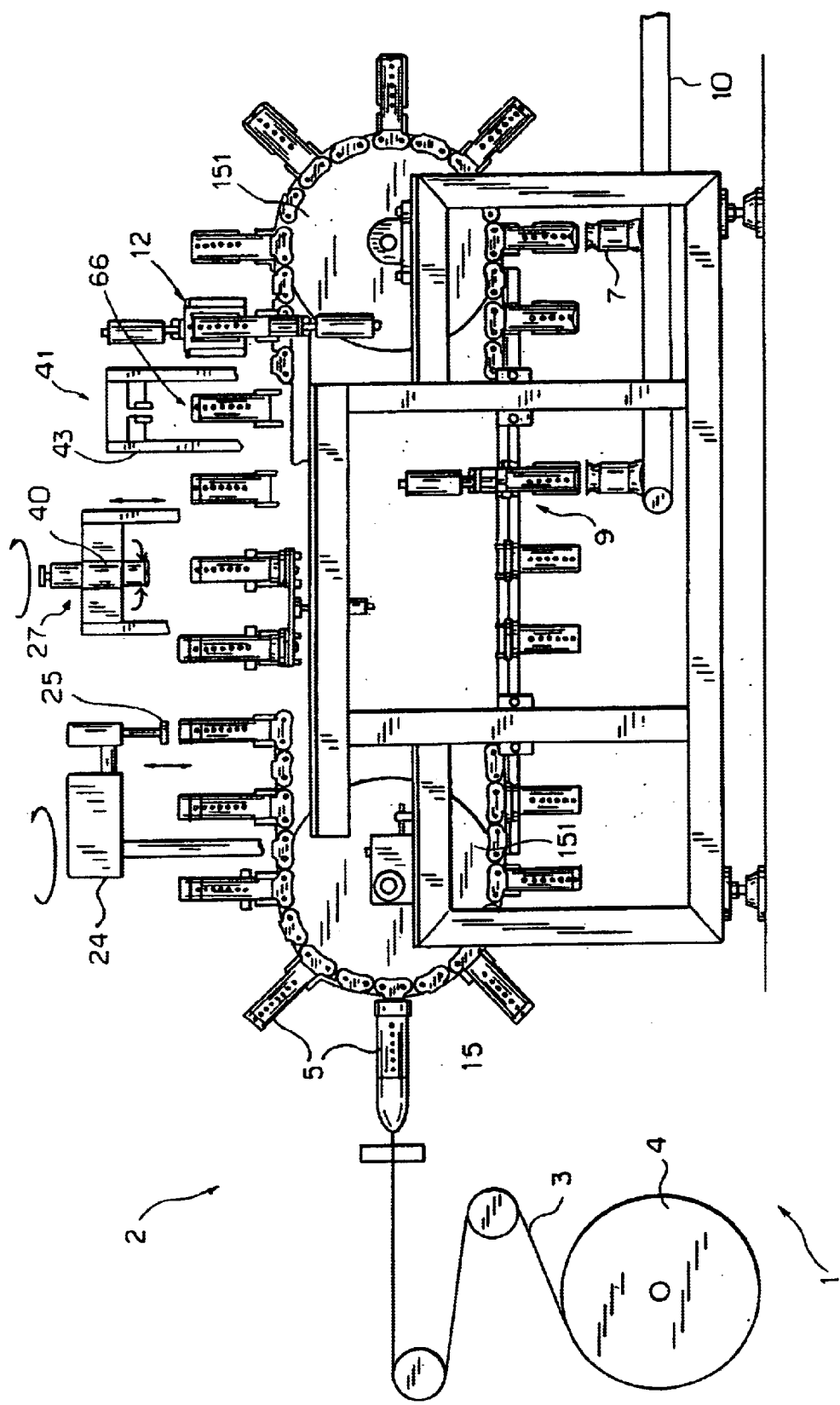
FIG. 6 is a schematic side view of a second embodiment of the invention.

The bonding means 41, only one of which is shown in FIG. 6 for simplicity, each comprise at least one pair of bonding jaws 42 of approximately semi-cylindrical form insertable by insertion actuators 43 into those positions of the tubular element 5 which are to be bonded to the base 25, and divergeable by means of actuators 44.

The pair of bonding jaws 42 of one bonding means 41 is perpendicular to the pair of bonding jaws of the other bonding means 41 to ensure continuity in the bonding of the base 25 to the container 7.

In operation, the forming and cutting station 2 forms the tubular element 5, the chains 15 transfer the support means 16 to the bonding station 6 where the base of the container 7 is formed, then to the shaping station 8 in which the container is given a predetermined shape, and finally to the exit means 10 which convey them for example to storage devices or to filling and closure machines.

The method for forming a container 7 starting from a reel of material in web form 3 comprises:
  forming a tubular element 5 from the web 3 of the reel 4 by folding the web 3 and bonding together its lateral edges, then cutting it transversely to obtain a tubular element 5 of predetermined diameter and height;
  mounting the tubular element 5 over a support 16;
  closing one end of the tubular element 5 by linear bonding to form the open container 7;
  forming a flange 18 at the other end of the container 7;
  heating the container 7 to a heating temperature of between 30° C. and 60° C.;
  inserting the container 7 into a mould 12, and closing the mould;
  forcing the walls of the container 7 against the inner walls of the mould 12 by feeding gas at a predetermined pressure of between 3 and 30 bar into said container 7;
  cooling the container 7 to a cooling temperature of between 30° C. and 6° C.;
  removing the overpressure from the interior of the container 7;
  extracting the container 7 from the mould 12;
  withdrawing the container 7 from the support 16.

The method also comprises folding the linearly bonded base by the effect of its interference with fixed guides 22 and pressing the folded base towards the interior of the container 7 before shaping its walls in the mould 12.

As an alternative to creating the base by linear bonding, the method comprises applying a base cover 25 close to the mouth of the tubular element 5, then folding the edge of the mouth against the cover 25 and finally bonding them together.

The main advantage of the present invention is the provision of a method and machine for forming, starting from a reel of web material, containers formed into different shapes comprising curved surfaces.

A further advantage of the present invention is the provision of a machine and method for forming containers from sheets of synthetic materials bonded to aluminium, paper and deformable crepe paper or from single-layer sheets.

A further advantage is the provision of a machine which is of easy construction and maintenance, of high reliability, and economically advantageous.

What is claimed is:

1. A method for forming a container, comprising the steps of:
  starting from a flexible web of heat-bondable material wound on a reel;
  forming a tubular element of predetermined diameter and height by bending the flexible web of heat-bondable material and bonding together opposite sides thereof at a first station;
  thereafter, mounting the tubular element over a support for the tubular element fixed to a rotatable endless conveyor at the first station;
  thereafter, closing a first end of the tubular element to form an open container at a second station and a third station downstream from the first station;
  inserting the container into a mould, heating the container, forcing walls of the container against inner walls of the mould, opening the mold and withdrawing the support and the container from the mould at a fourth station downstream from the third station and thereafter, withdrawing the container from the support.

2. A method as claimed in claim 1, further comprising the step of forming a flange at the mouth of the container at a second end of the tubular element which is engaged on a base of the support at the third station prior to insertion of the container into the mould.

3. A method as claimed in claim 1, wherein the first end of the tubular element is closed by pinch-bonding while being mounted over the support at the second station.

4. A method as claimed in claim 2, wherein after the pinch-bonding the first end of the tubular element, folding back the first end by interference with fixed guides and pressing the first end towards an interior of the container at the third station.

5. A method as claimed in claim 1, wherein the first end of tubular element is closed by applying a flat cover into a mouth of the tubular element at the second station, and then bonding a base thereof at the third station.

6. A method as claimed in claim 5, wherein before bonding the base, the mouth edge abutting the cover is clinched onto the cover.

7. A method as claimed in claim 1, wherein within the mould the container undergoes permanent deformation in the direction orthogonal to the axis of the tubular element.

8. A method as claimed in claim 1, wherein the support has a height measured from a base on which the tubular element rests, less than the length of the tubular element.

* * * * *